United States Patent
Huang et al.

(10) Patent No.: US 7,053,884 B2
(45) Date of Patent: May 30, 2006

(54) INPUT APPARATUS WITH SUPPORTING ARM

(75) Inventors: Chun-Chung Huang, Taipei (TW); Chin-Chen Li, Shinjuang (TW)

(73) Assignee: Darfon Electronics Corp., Taoyuan (TW)

( * ) Notice: Subject to any disclaimer, the term of this patent is extended or adjusted under 35 U.S.C. 154(b) by 670 days.

(21) Appl. No.: 10/135,074

(22) Filed: Apr. 30, 2002

(65) Prior Publication Data

US 2002/0167491 A1 Nov. 14, 2002

(30) Foreign Application Priority Data

May 10, 2001 (TW) ............................... 90111130 A

(51) Int. Cl.
*G09G 5/00* (2006.01)
(52) U.S. Cl. ..................... 345/168; 341/22; 361/680
(58) Field of Classification Search ............... 345/156, 345/162, 168–179, 184; 361/680; 178/18.01, 178/18.03; D14/344, 346, 426–461, 145–151, D14/268, 252; 455/347; 341/20, 22–26
See application file for complete search history.

(56) References Cited

U.S. PATENT DOCUMENTS

| | | | | |
|---|---|---|---|---|
| 5,187,644 A | * | 2/1993 | Crisan ......................... 361/680 |
| 5,416,479 A | * | 5/1995 | Jondrow et al. ............... 341/20 |
| D359,479 S | * | 6/1995 | Jondrow et al. ........... D14/407 |
| 5,428,355 A | * | 6/1995 | Jondrow et al. ............... 341/20 |
| 6,025,986 A | * | 2/2000 | Sternglass et al. ........... 361/680 |
| 6,121,960 A | * | 9/2000 | Carroll et al. ............... 345/173 |
| 6,384,810 B1 | * | 5/2002 | Selker ........................ 345/168 |
| 6,392,870 B1 | * | 5/2002 | Miller, Jr. .................... 361/680 |
| 6,700,773 B1 | * | 3/2004 | Adriaansen et al. ......... 361/680 |
| 6,734,842 B1 | * | 5/2004 | Woodmansee et al. ...... 345/169 |
| 2002/0042853 A1 | * | 4/2002 | Santoh et al. .................. 710/8 |
| 2002/0063689 A1 | * | 5/2002 | Rogers ....................... 345/168 |
| 2002/0118175 A1 | * | 8/2002 | Liebenow et al. ........... 345/168 |
| 2003/0100338 A1 | * | 5/2003 | Lee ............................. 455/556 |

* cited by examiner

*Primary Examiner*—Alexander Eisen
(74) *Attorney, Agent, or Firm*—Snell & Wilmer L.L.P.

(57) ABSTRACT

An input apparatus and auxiliary input apparatus are described. In one embodiment, the input apparatus has an input unit and at least one supporting arm. Users hold the supporting arms with some of their fingers and operate the input units with other of their fingers. In another embodiment, the auxiliary data input apparatus utilizes an attachment device, e.g. a clip, to attach the auxiliary input apparatus to an electronic or mechanical device, e.g. a separable keyboard, to facilitate input operations. The auxiliary input apparatus has at least one supporting arm. Users hold the supporting arms with some of their fingers and operate the electronic or mechanical device with other of their fingers.

16 Claims, 5 Drawing Sheets

INPUT APPARATUS WITH SUPPORTING ARM

This application claims priority of Taiwan Patent Application Serial No. 09011130 filed on May 10, 2001.

FIELD OF INVENTION

The present invention relates to an input apparatus, and especially to a small size input apparatus with a supporting arm.

BACKGROUND OF THE INVENTION

As electronics technologies progress, many different kinds of input devices, such as keyboards, mice, and light pens have been developed. In addition to conventional personal computers, many new electronic devices make use of one or more input devices to input or retrieve data.

As technology progresses, many electronic devices are continually made smaller and smaller. A typical electronic device such as a mobile phone, personal digital assistant (PDA), electronic translator, notebook computer, digital camera, digital recording pen, game console or the like, is typically manufactured in a size that is small enough to be portable and convenient for mobile users. The portability frequently creates problems while users perform input or output operations over the electronic device since many miniaturized input devices are difficult, inconvenient, or uncomfortable to use. Examples of space-saving input devices include light pens, mice, keyboards, drawing pads and the like.

An alternative to a miniaturized input apparatus involves providing an input apparatus separate from the electronic device itself. In other words, the input apparatus becomes a separable peripheral apparatus that connects to the device in operation. For example, a mobile phone or PDA frequently has a separable keyboard or other similar separable peripheral input devices. Even the input apparatus designed to be a separable component, however, is frequently too small for comfortable portable use. An auxiliary input apparatus is desired to overcome the problems mentioned above.

SUMMARY OF THE INVENTION

The input apparatus of present invention includes a case, an input unit and at least one supporting arm. A user holds the arms with some of his/her fingers and performs the input operation with others of his/her fingers. The input apparatus may be a keyboard, a joystick, a drawing pad or other similar device.

Furthermore, various embodiments of the input device include a space for receiving the supporting arm when not in use. The receiving space may be a slot, a groove, or the like.

Further exemplary embodiments of the input device includes an activation device that has a resilient unit connecting to supporting arms. The activation device has a switch, such as a button or other similar actuator. When the activation device is actuated, the resilient unit drives the supporting arms to escape from the receiving spaces as appropriate. When the supporting arms are not in use, the supporting arms may be received into the receiving spaces by the activation device.

The input apparatus may also include a connector to transmit the inputted results to the electronic device. The electronic device can be a PDA, a digital camera, a game console, a mobile phone or other similar device.

Further, an auxiliary input apparatus may be attached to an electronic device by an attachment device that includes a clip or other appropriate connector. Additionally, the auxiliary input apparatus may be also attached to a mechanical apparatus, such as a keyboard, to provide an auxiliary input function.

DETAILED DESCRIPTION

Here, several embodiments are utilized to explain the present invention in detail. It is noted that the embodiments are only examples and should not restrict the scope of the present invention.

First Exemplary Embodiment

Figure 1A:
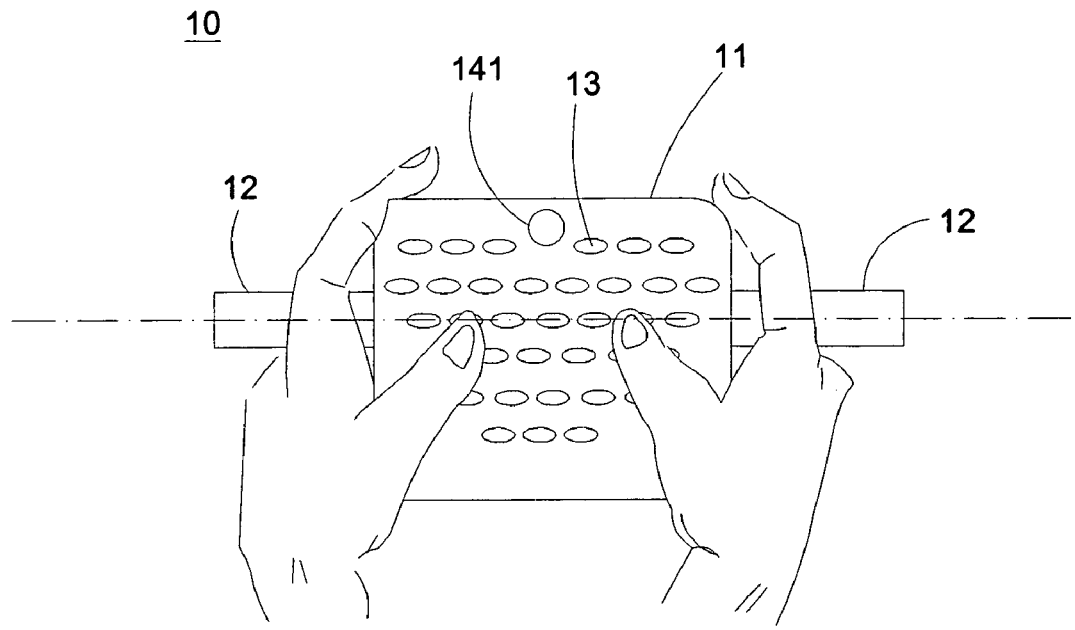
FIG. 1a and FIG. 1b are schematic diagrams of a first exemplary embodiment.
Figure 1B:
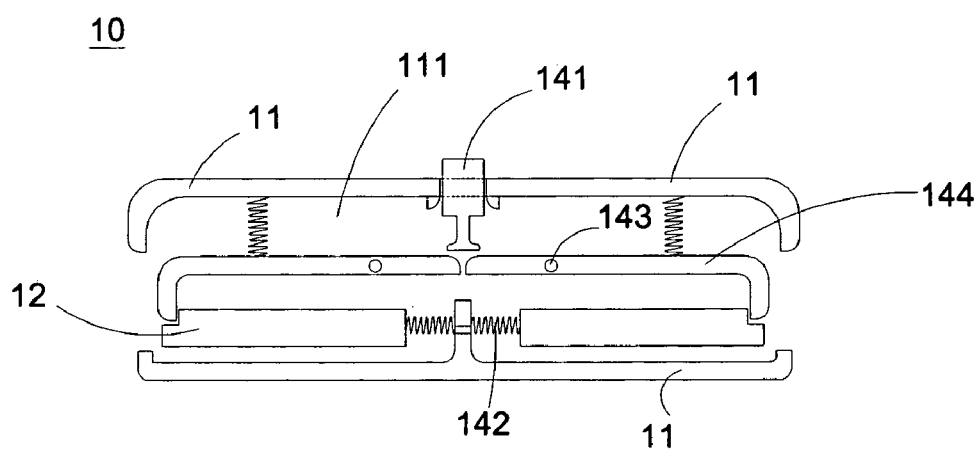

Referring now to FIGS. 1a and 1b, FIG. 1a shows a top view of a user utilizing an exemplary input apparatus with supporting arms 12. FIG. 1b is a cross-sectional diagram showing supporting arms 12 as received within the inner space of the case 11. The input apparatus 10 includes a case 11, supporting arms 12, input units 13 (e.g. buttons, keys or the like) and a switch 141. The supporting arms 12, the input units 13 and the switch 141 are operationally coupled to each other, and disposed on the case 11. In the exemplary embodiment shown, the supporting arms 12 are a pair of shafts disposed in the horizontal direction. The input units 13 may be implemented with push buttons, keys or the like. Switch 141 is a button or other appropriate switching element.

With continued reference to FIG. 1a, the supporting arms 12 are in a spread-out position while the user is utilizing input apparatus 10. The user puts his/her forefinger on one side of the supporting arms 12, and his/her middle and little fingers on the other side of the supporting arms 12. In this manner, the user holds the supporting arms 12 from both sides with his/her forefinger, middle, and little fingers to operate input units 13 with his/her thumbs, as appropriate. Due to the support function of supporting arms 12 during input operations, the invention provides easy access for data entry and other operations of the device.

Referring now to FIG. 1b, case 11 suitably includes a receiving space 111. An activation device for spreading out the supporting arms 12 suitably includes a switch 141, a resilient unit 142, a shaft 143, and a lever 144. The activation device is disposed in the case 11, as appropriate. The resilient unit 142 drives the supporting arm 12 to escape from the receiving space 111 when activation device 141 is actuated. One end of the resilient unit 142 is connected to one end of the supporting arms 12. In the exemplary embodiment shown, receiving space 111 includes a slot, resilient unit 142 is a spring, and case 11 has an opening for allowing movements of the supporting arms 12.

With continued reference to FIG. 1b, when input apparatus 10 is not in use, the supporting arms 12 may be received in the receiving space 111 as appropriate to conserve space.

An exemplary automatic spread-out function of supporting arms 12 is disclosed in FIG. 1b. In the receiving state, supporting arm 12 receives a bias force from resilient unit 142. This force is biased, as appropriate, by lever 144 which blocks the supporting arm 12 to keep it in the receiving space 111. When the switch 141 is actuated, switch 141 pushes one end of the lever 144 to rotate lever 144 about shaft 143. As lever 144 moves from its original position, supporting arm 12 is no longer blocked. As a result, supporting arms 12, which bear the forces from resilient units 142, spread out as shown in FIG. 1a.

The activation device as shown in FIG. 1b, may be further modified to automatically drive supporting arms 12 into the receiving spaces 111. In such embodiments, while the supporting arms 12 are spread out, they respectively bear a pulling force from resilient units 142. However, the lever 144 suitably blocks the supporting arm 12 to maintain the spread-out configuration. When switch 141 is actuated, switch 141 pushes one end of lever 144, to rotate lever 144 about the shaft 143. Hence the levers 144 leave the blocking position, and the pulling force of resilient unit 142 drives supporting arms 12 into the receiving space 111.

Input apparatus 10 may be connected to any sort of electronic device, such as a PDA, a mobile phone, a game console, an interactive television, a notebook computer, a palm computer, a digital camera, or any other device through any wired or wireless technique. For example, input apparatus 10 can be a keyboard coupled to a PDA (not shown in FIGS. 1a–b), and the input result is transferred to the PDA via a connector (not shown in FIGS. 1a–b). With this embodiment, even a small input apparatus can be easily held by users' hands. The user can therefore easily operate the input apparatus with his/her fingers to input data into the device as appropriate, thus making the portable electronic device more convenient to operate.

Second Exemplary Embodiment

Figure 2A:
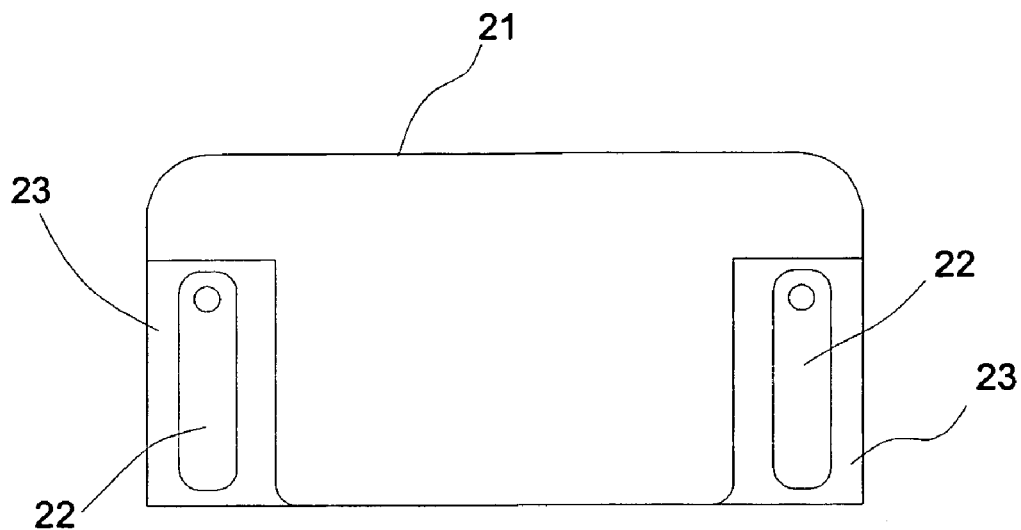
FIG. 2a and FIG. 2b are schematic diagrams of a second exemplary embodiment.
Figure 2B:
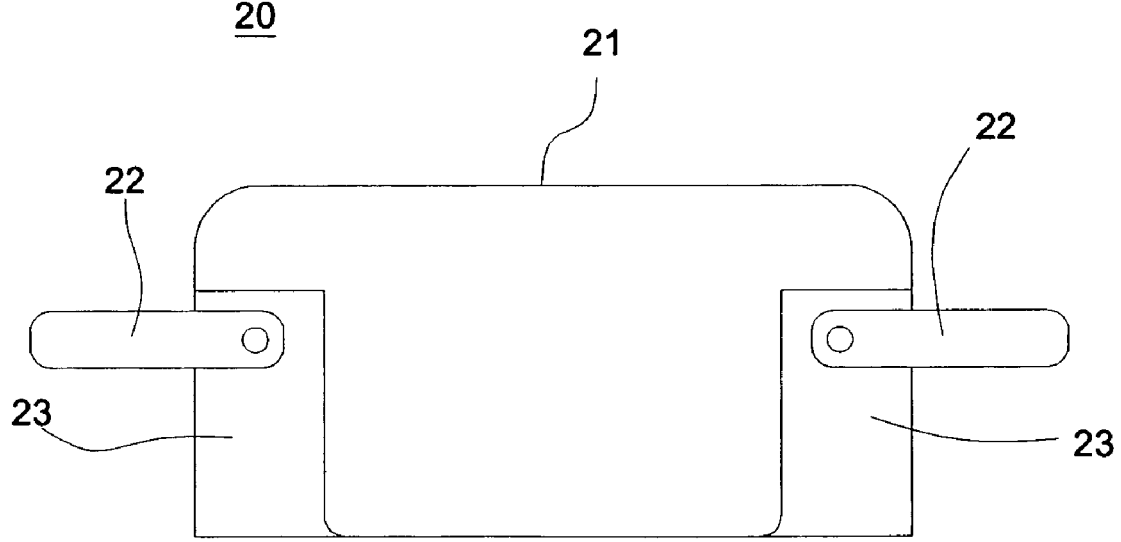

Please refer to FIG. 2a and FIG. 2b, which show an input apparatus 20 in receiving and spread-out configurations, respectively. The input apparatus 20 includes a case 21 and supporting arms 22. The case 21 has receiving spaces 23 for storing the supporting arms 22, as appropriate.

With reference to FIG. 2a, while the supporting arms 22 are not in use, they may be received in receiving space 23. In the exemplary embodiment shown in the figure, the receiving spaces 23 are slots. The shape of the receiving spaces 23 is an exposed slot as shown in FIG. 2a, or any other shape as appropriate.

With reference now to FIG. 2b, supporting arms 22 are spread out to assist the user in operation of a device. The user holds the supporting arms 22, with some of his/her fingers and practices an input operation with others fingers, as appropriate. The configurations of the supporting arms 22 can be changed manually or automatically by the activation devices shown in the first embodiment above.

Supporting arms 22 may be connected to case 21 using a hinge, pivot or other connector. In addition, the supporting arms 22 may connect to the case 21 using latches to maintain the spread-out configuration when supporting arms 22 are used, and detached from the case 21 by releasing the latches when the supporting arms 22 are not used.

Third Exemplary Embodiment

Figure 3A:
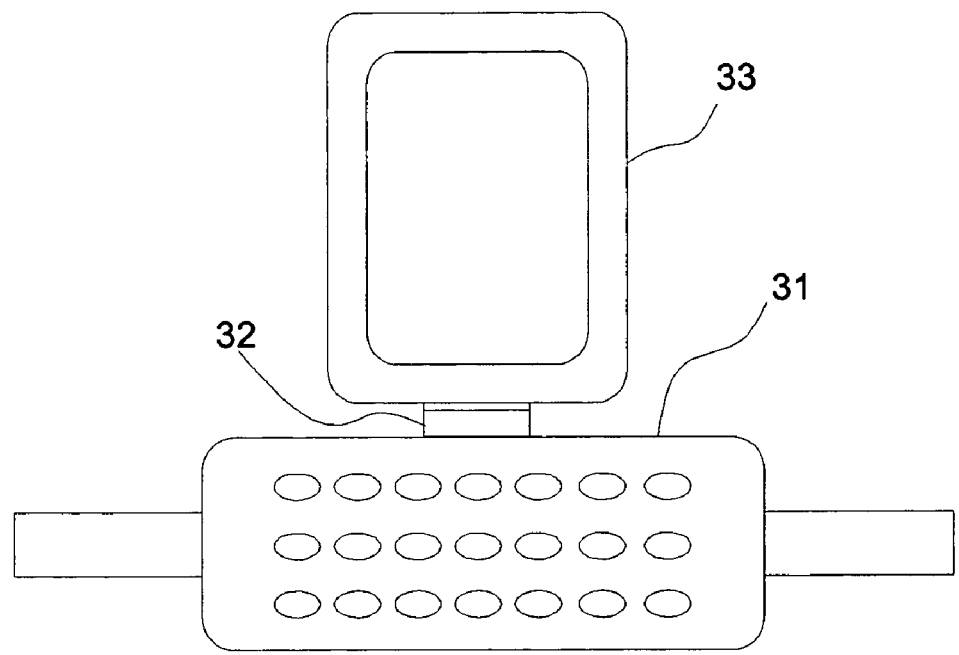
FIG. 3a, FIG. 3b and FIG. 3c are schematic diagrams of third, fourth and fifth exemplary embodiments, respectively.

With reference to FIG. 3a, an input apparatus 31 is connected to an electronic device 33 via a connector 32. In the exemplary embodiment shown in the figure, the electronic device 33 is a PDA, connector 32 is a socket such as an RS/232 or USB interface, and input apparatus 31 is a keyboard, as appropriate. The data inputted from the input apparatus 32 is suitably transferred to electronic device 33 via connector 32, which appropriately interferes with a corresponding connector on device 33.

Fourth Exemplary Embodiment

Figure 3B:
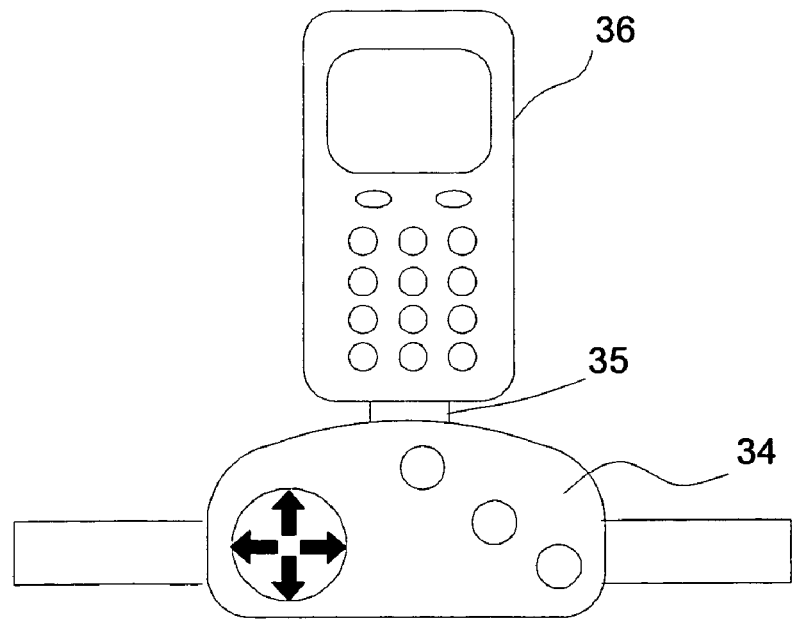

With reference now to FIG. 3b, an input apparatus 34 is connected to an electronic device 36 via a connector 35. In the embodiment shown in the figure, the electronic device 36 is a mobile phone and input apparatus 34 is a joystick.

Fifth Exemplary Embodiment

Figure 3C:
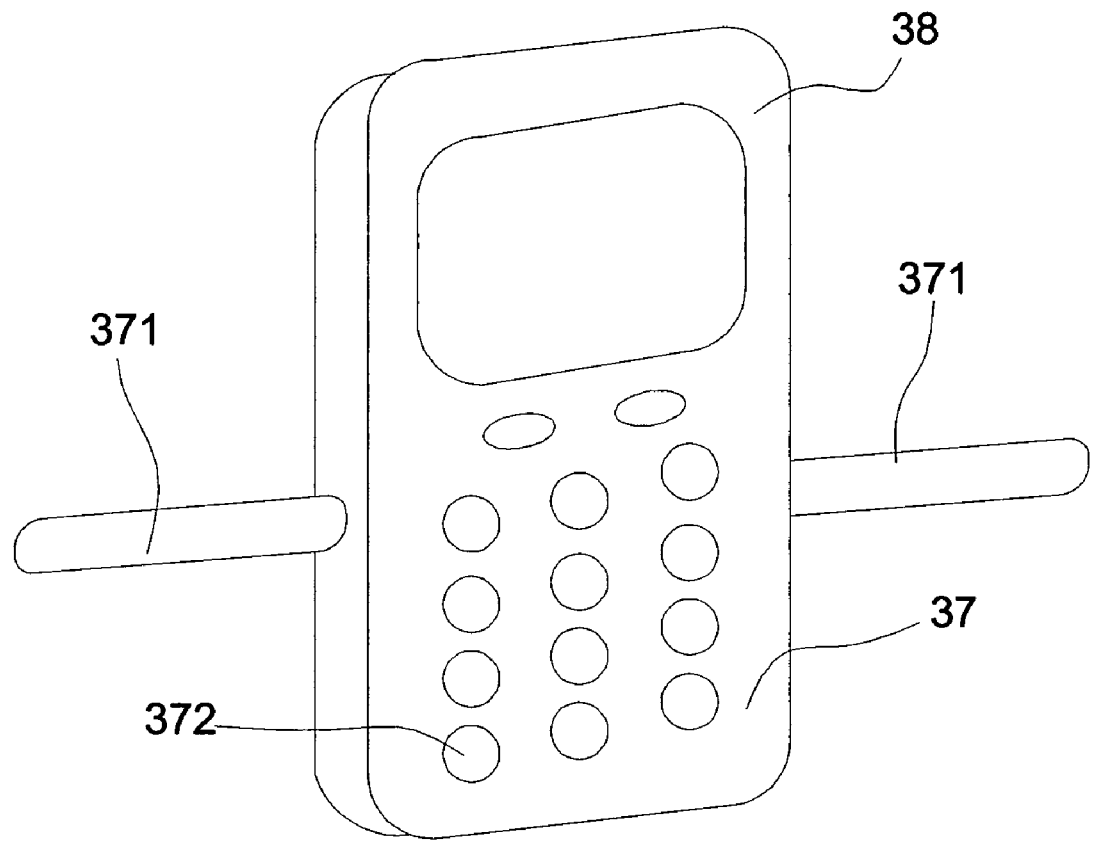

With reference now to FIG. 3c, an input apparatus 37 is appropriately integrated with an electronic device 38. The input apparatus 37 and the electronic device 38 are suitably integrated into the same case with supporting arms 371 assisting the input operation. In this embodiment, the electronic device 38 is a mobile phone or other portable device. Input units 372 of input apparatus 37 may be buttons or other controls on device 372.

Sixth Exemplary Embodiment

Figure 4A:
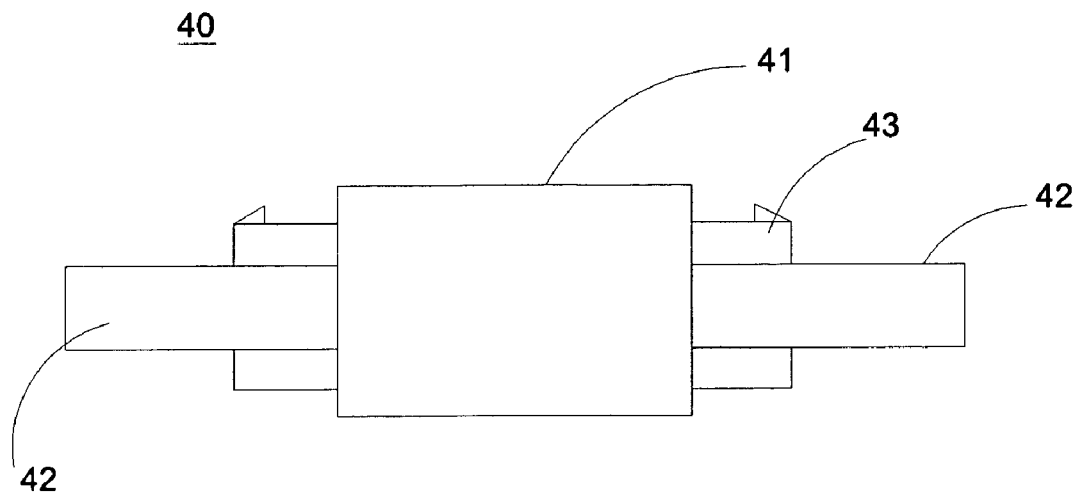
FIG. 4a is a schematic diagram of an exemplary auxiliary input apparatus.
Figure 4B:
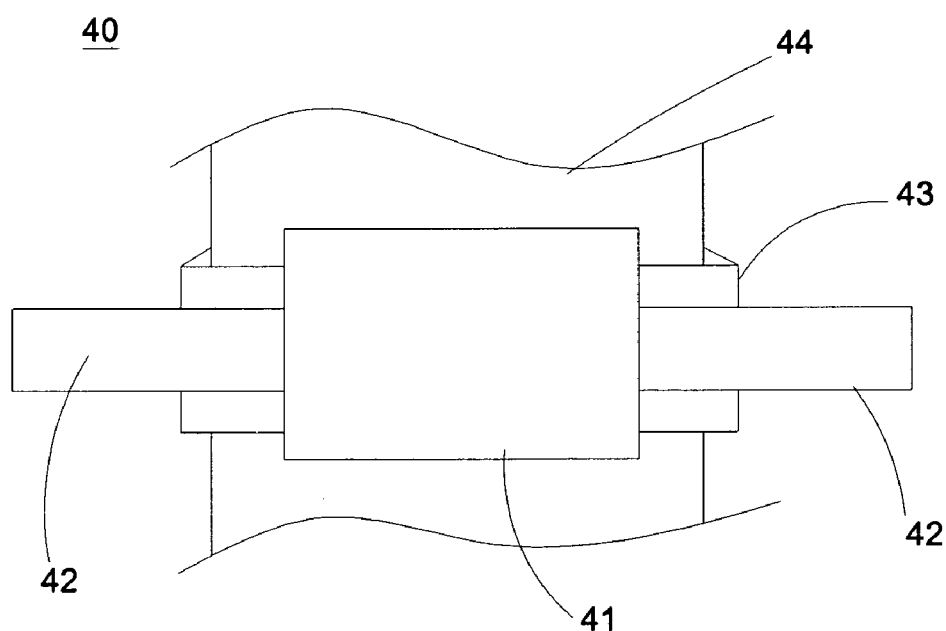
FIG. 4b is a schematic diagram showing an exemplary auxiliary input apparatus attached to an electronic device.

With reference now to FIGS. 4a and 4b, an auxiliary input apparatus 40 suitably includes an attachment device 41 and supporting arms 42. In this exemplary embodiment, the attachment device 41 includes a clip 43. The clip 43 can be substituted or augmented with any connector having an attaching function, such as a screw, latch, slot or the like.

Similar to the first embodiment, attachment device 41 has a receiving space and an activation device for receiving or ejecting supporting arms 42, respectively. In order to make the description concise, the function of the supporting arms 42 is not repeated here.

With reference now to FIG. 4b, auxiliary input apparatus 40 is appropriately attached to electronic device 44 via attachment device 41. The auxiliary input apparatus 40 provides an auxiliary supporting function during data input operation. The electronic device 44 may be a PDA, a mobile phone, a palm computer, or the like. According to similar purposes, the auxiliary input apparatus 40 may be attached to a mechanical device, such as a keyboard for assisting data input.

It should be appreciated that the present invention has many equivalent embodiments and applications. The input and auxiliary input apparatus of the invention can be integrated or attached with any electronic or mechanical devices, for example, to provide auxiliary input.

While this invention has been described with reference to illustrative embodiments, these descriptions are not intended to be constructed in a limiting sense. Various modifications of the illustrative embodiment, as well as other embodiments of the invention, will be apparent to persons skilled in the art upon reference to these descriptions. It is therefore contemplated that the appended claims will cover any such modifications or embodiments as fall within the true scope of the invention.

The invention claimed is:

1. An input apparatus comprising:
   a case having a receiving space;
   an input unit disposed on said case for a user to perform an input operation;
   at least one supporting arm connecting to said case and selectively stored in said receiving space, said user holding said supporting arm with some of his/her fingers while performing said input operation with other of his/her fingers; and
   an activation device connecting to said case;
   wherein said activation device has a resilient unit and a switch, and wherein said resilient unit drives said supporting arm to escape from said receiving space when said switch is actuated.

2. The input apparatus according to claim 1, wherein said receiving space is a slot.

3. The input apparatus according to claim 1, wherein said receiving space is a groove.

4. The input apparatus according to claim 1, wherein said supporting arm is separably connected to said case.

5. The input apparatus according to claim 1, wherein said input unit is a keyboard.

6. The input apparatus according to claim 1, wherein said input unit is a joystick.

7. The input apparatus according to claim 1, wherein said input apparatus is integrated with an electronic device.

8. The input apparatus according to claim 7, wherein said electronic device is a personal digital assistant (PDA).

9. An input apparatus comprising:
   a case having a receiving space;
   an input unit disposed on said case for a user to perform an input operation;
   at least one supporting arm connecting to said case and selectively stored in said receiving space, said user holding said supporting arm with some of his/her fingers while performing said input operation with other of his/her fingers; and
   an activation device connecting to said case;
   wherein said activation device has a resilient unit and a switch, and wherein said resilient unit drives said supporting arm into said receiving space when said switch is actuated.

10. An auxiliary input apparatus used for selectively attaching to a first apparatus, said auxiliary input apparatus comprising:
    an attachment device, attached to said first apparatus in a separately manner, said attachment device having a receiving space;
    at least one supporting arm connecting to said attachment device such that a user holds said at least one supporting arm with some of his/her fingers and operates said first apparatus with other of his/her fingers when said attachment device is attached to said first apparatus, said supporting arm is selectively stored in said receiving space; and
    an activation device having a resilient unit and a switch; wherein said resilient unit drives said supporting arm to escape from said receiving space when said switch is actuated.

11. The auxiliary input apparatus according to claim 10, wherein said attachment device comprises a clip.

12. The auxiliary input apparatus according to claim 10, wherein said first apparatus is an input apparatus.

13. The auxiliary input apparatus according to claim 12, wherein said input apparatus is a keyboard.

14. The auxiliary input apparatus according to claim 10, wherein said first apparatus is an electronic device.

15. The auxiliary input apparatus according to claim 14, wherein said electronic device is a personal digital assistant (PDA).

16. An auxiliary input apparatus used for selectively attaching to a first apparatus said auxiliary input apparatus comprising:
    an attachment device, attached to said first apparatus in a separately manner, said attachment device having a receiving space;
    at least one supporting arm connecting to said attachment device such that a user holds said at least one supporting arm with some of his/her fingers and operates said first apparatus with other of his/her fingers when said attachment device is attached to said first apparatus, said supporting arm is selectively stored in said receiving space; and
    an activation device having a resilient unit and a switch, wherein said resilient unit drives said supporting arm into said receiving space when said switch is actuated.

* * * * *